United States Patent [19]

Hojnacki et al.

[11] Patent Number: 5,183,159

[45] Date of Patent: Feb. 2, 1993

[54] SUSPENSION CUSHIONING PACKAGE

[75] Inventors: Robert J. Hojnacki, Guilford, Conn.;
Daniel C. Pearson, Warminster, Pa.;
Gerard K. Brucker, Horsham, Pa.;
Michael J. Gober, Warrington, Pa.;
Daniel J. Shaw, Jr., Haverhill, Mass.

[73] Assignee: United Foam Plastics, Georgetown, Mass.

[21] Appl. No.: 736,226

[22] Filed: Jul. 26, 1991

[51] Int. Cl.⁵ ............................................ B65D 85/30
[52] U.S. Cl. ...................................... 206/583; 206/591
[58] Field of Search ............ 206/583, 591, 521, 521.6, 206/522

[56] References Cited

U.S. PATENT DOCUMENTS

| | | | |
|---|---|---|---|
| 514,051 | 2/1894 | West | 206/583 X |
| 2,134,908 | 11/1938 | Copeman | 206/521.6 X |
| 2,681,142 | 6/1954 | Cohen | 206/522 |
| 2,811,246 | 10/1957 | Sloane | 206/583 X |
| 3,552,595 | 1/1971 | Gerner et al. | 206/583 X |
| 4,267,684 | 5/1981 | Ambrose | 206/583 X |
| 4,491,225 | 1/1985 | Baillod | 206/583 |
| 4,759,444 | 7/1988 | Barmore | 206/583 X |
| 4,852,743 | 8/1989 | Ridgeway | 206/583 |
| 4,903,827 | 2/1990 | Phelps et al. | 206/583 X |
| 4,923,065 | 5/1990 | Ridgeway | 206/583 |

FOREIGN PATENT DOCUMENTS

| | | | |
|---|---|---|---|
| 2723175 | 11/1978 | Fed. Rep. of Germany | 206/583 |
| 0135796 | 11/1978 | Japan | 206/583 |
| 475299 | 11/1937 | United Kingdom | 206/583 |

Primary Examiner—Bryon P. Gehman
Attorney, Agent, or Firm—Testa, Hurwitz & Thibeault

[57] ABSTRACT

A reusable container for packaging objects for shipping is disclosed. The container comprises a pair of outer frame members having a clamshell configuration in which the two frame members are connected by a reclosable hinge. The container has removable insert trays which each fit into one of the frame members, each insert tray having a resilient film covering the well portion of the tray. The insert trays are each designed to interfit tightly into one of the frame members to form the complete package. When the package is closed, the resilient film stretches around an object to be shipped thereby suspending it in the interior of the container.

13 Claims, 3 Drawing Sheets

SUSPENSION CUSHIONING PACKAGE

BACKGROUND OF THE INVENTION

Packaging used for shipping various objects is changing to respond to users, and customers' environmental and cost concerns. For example, reusable containers are becoming more prevalent, as are containers that do not use disposable packing materials. Customers are demanding reusable containers or packages which provide cost-effective packaging for their products and which minimize waste generation.

One container which was developed in response to this demand, for example, is a one-piece, hinged "clamshell" container which has a resilient film attached over the interior portions covering both halves of the clamshell. The object to be shipped is inserted between the two halves of the clamshell, and when the shell is closed, the object is immobilized between the films and thus suspended and cushioned against impact within the shell. This design has several drawbacks, however. The film is sonically welded to the shell, which causes thermal distortion in the hinge connecting the two halves of the shell, thereby rendering the closure imperfect, and preventing the package from being reused. When the film is broken or damaged, it is difficult to replace because further sonic welding or thermal bonding used to reattach the film is not cost effective and can cause additional distortion in the shell, and thus the package must be discarded.

It is an object of the present invention to provide a reusable, cost-effective container which does not contain or require the use of any disposable materials and which provides a high degree of protection for the products being shipped.

SUMMARY OF THE INVENTION

The present invention relates to a device for immobilizing an object for shipping. The device is a "clamshell" structure comprising a pair of frame members each having a planar face and a well extending therebelow. The frame members are connected by a reclosable hinge. The hinge articulates between an open and a closed position and allows the frame members to be closed so that the two planar faces defined by the frame members meet face-to-face. The device further comprises removable insert trays which contain flanged sidewalls and which are dimensioned to fit tightly into the wells of the frame members. The insert trays have a stretchable, resilient film attached to the flanges of the sidewalls which film completely covers the well of the insert tray. When the insert tray is placed in the well of the frame member, the film is disposed substantially in parallel with the planar face of the frame member. A means for locking the device in a closed position is also included.

The object to be shipped is placed on the film covering one of the insert trays, and the "clam" is closed, thereby bringing the surfaces of the films together in a face-to-face position. The films stretch to accommodate the object, thereby immobilizing the object between the film surfaces. Thus, the object is safely suspended within the interior of the package.

The present invention has several advantages. The package can be reused several times because the resilient film regains substantially its original shape once the object is removed. The insert trays can be removed from the frame, so that they can be replaced, if necessary, and the frame can be reused. The removable insert trays also allow the film to be replaced without exposing the outer frame to heat or sonic energy which could distort the frame or the hinge.

The present container is particularly useful for packing fragile objects for shipping. The object is suspended in "air" between the films, and impacts sustained by the frame portion are not transmitted to the object except through the film. The outer shell can be reinforced, if necessary, to provide more protection for the object.

DETAILED DESCRIPTION OF THE DRAWINGS

The invention provides a reusable container for packing objects for shipping in which the object is suspended in a chamber between resilient films, thereby immobilizing and protecting it from shipping stress. The container will be more fully described with reference to the Figures. The Figures depict one embodiment of the present invention, and it should be understood that the invention can be embodied in devices having shapes or configurations other than those illustrated in the Figures.

Figure 1:
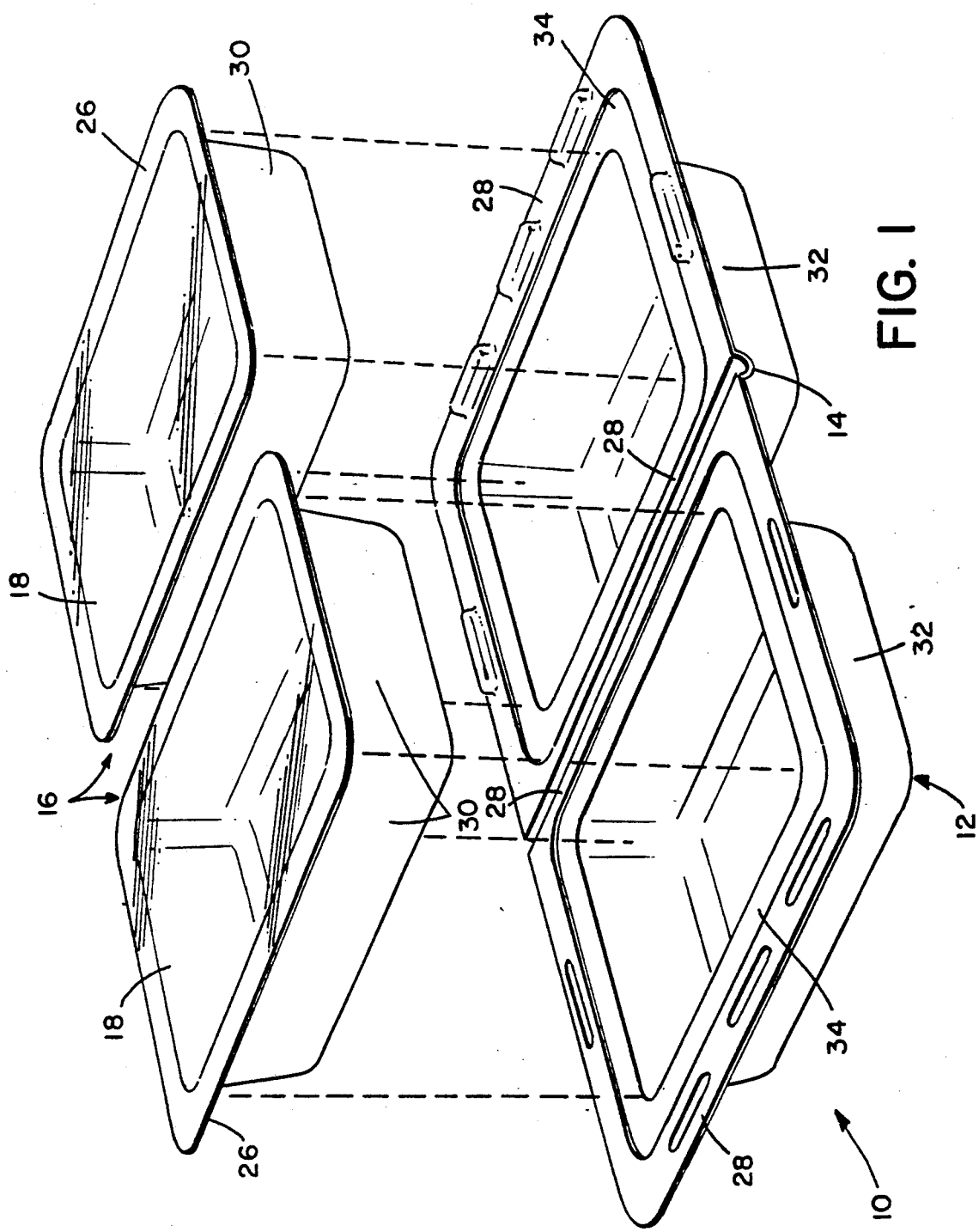
FIG. 1 is a perspective exploded view of the present container separately showing the removable insert trays.

Referring to the Figures, FIG. 1 is a perspective view of an embodiment of the present invention. As shown the present package device 10 has a "clamshell" configuration, in which two frame members 12 are connected via a reclosable hinge 14. Each frame member 12 defines a well 32 and a planar face 28.

The hinge 14 is designed to permit articulation between an open position and a closed position in which the planar faces 28 of the frame members 12 are disposed face-to-face. A "living" hinge is particularly preferred for this purpose, that is, a hinge which freely articulates.

Each insert tray 16 comprises sidewalls 30 and flanges 26 around the perimeter of the sidewalls. The sidewalls 30 define a well dimensioned to fit within the wells 32 of the frame members 12. Each insert tray has a resilient film 18 stretched across the entire top side of the insert tray 16 spanning the well portion thereof. The film 18 is bonded to flanges 26 of insert 16. The film 18 is an elastic film selected so that it stretches or distends to accommodate the shape of an object placed in the package, and is preferably sufficiently elastic to resume substantially its original shape when the object is removed. The insert tray can have a bottom wall 36, shown in FIG. 2, which, together with the sidewalls and film, define an enclosure.

Removable insert tray 16 has the same configuration as frame member 12, and is designed to fit tightly into well 32 of frame member 12. For this purpose, frame member 12 can have a depressed area 34 around the perimeter of well 32 to accommodate the flange portion 26 of the insert tray. The insert trays 16 preferably "snap" into the outer frame members 12 such that they friction fit firmly in wells 32 of frame members 12.

Figure 2:
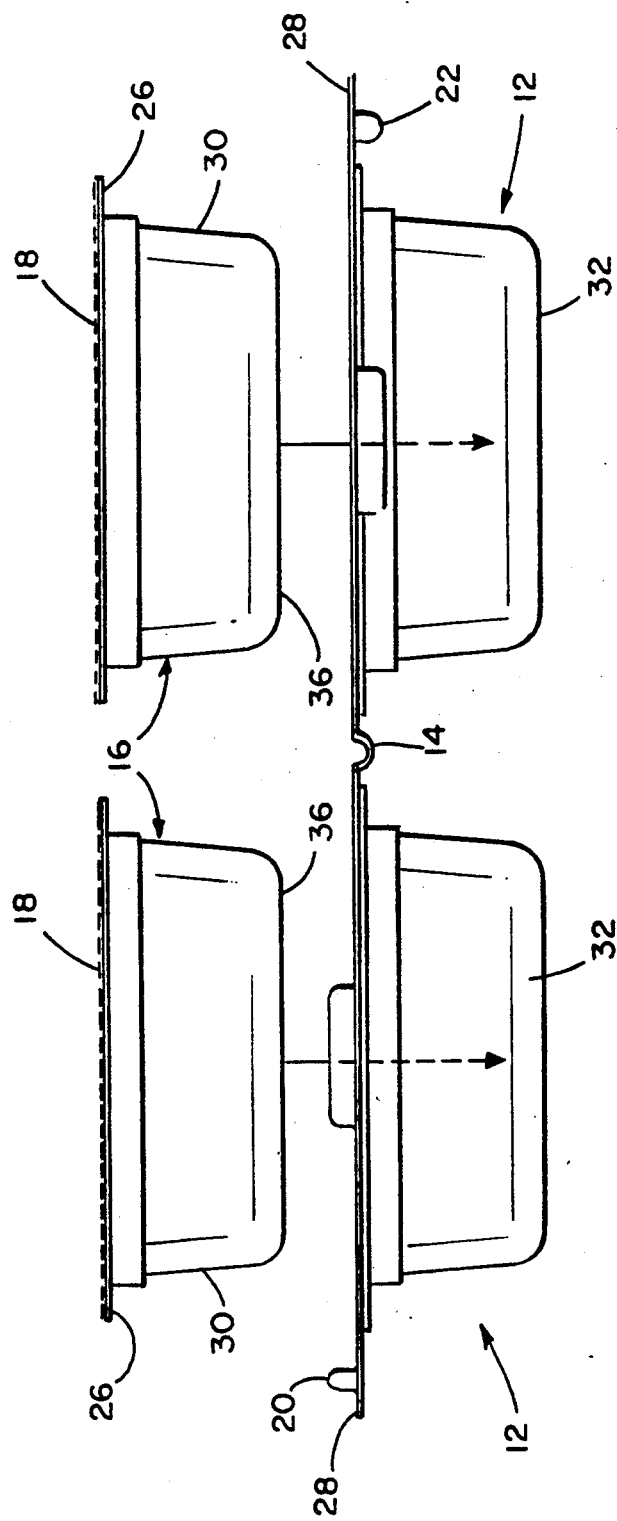
FIG. 2 is a side view of the present hinged container, separately showing the removable insert trays.
Figure 3:
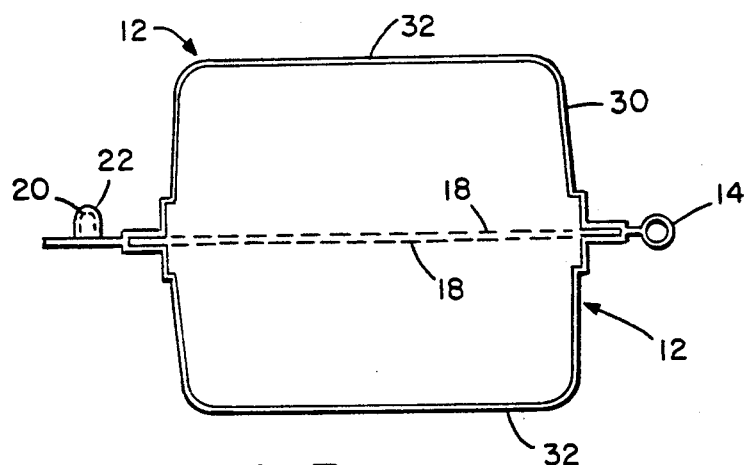
FIG. 3 is a vertical cross-sectional view of the present hinged container in a closed position with the trays in place.

The package 10 preferably contains fastening or locking means to keep the shell formed by frame members 12 tightly closed. Many types of fastening means known in the art can be used for this purpose. For example, a rubber band, one or more strips of adhesive tape, cords or string can be used to keep the shell closed. In a preferred embodiment of the present invention, interlocking fastening means are integrally included in the planar face 28 of frame members 12. Referring to FIG. 2, a receiver 22 and a projection 20 can be incorporated into frame member 12. The receiver 22 and the projection 20 are dimensioned to fit tightly together, and are positioned so that they line up when the shell is closed. When the shell is closed, as shown in FIG. 3, projection 20 friction fits tightly into receiver 22. One or more of such locking means can be included in the package design, as desired or needed.

Figure 4:
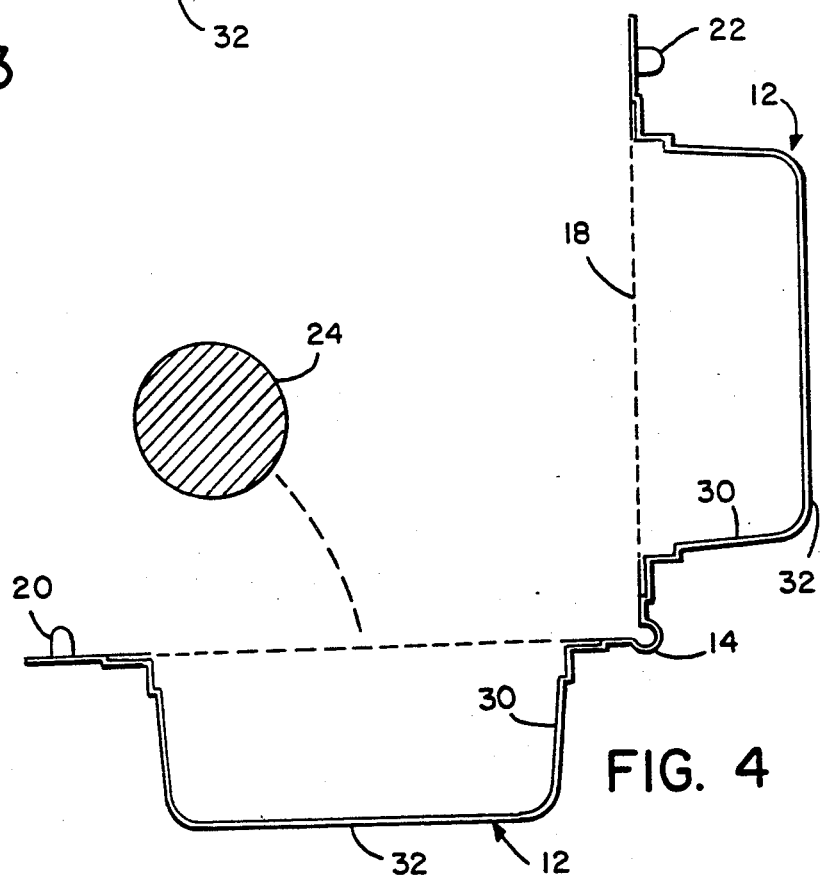
FIG. 4 is an illustration demonstrating how an object is placed in the container.
Figure 5:
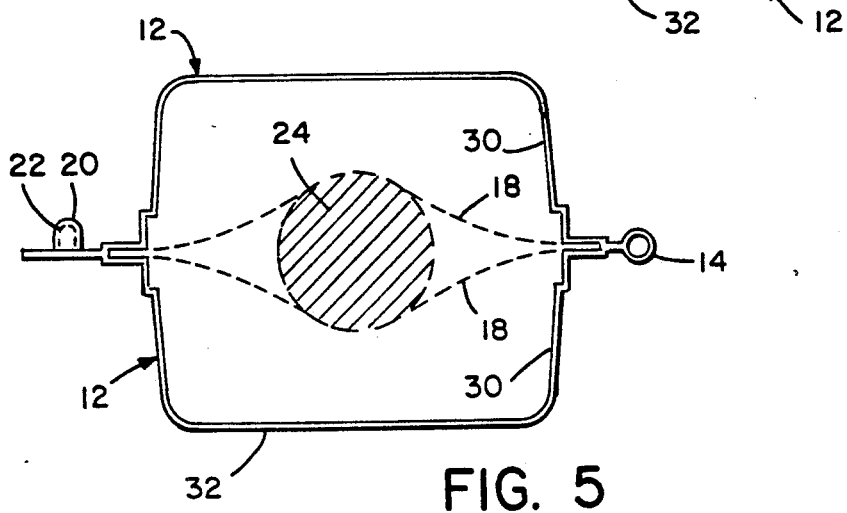
FIG. 5 is an illustration showing the object suspended between the two film layers when the container is closed.

In operation, an object 24 to be packed is placed on one of the films 18, as shown in FIG. 4. The package is then closed by bringing the planar faces of frame members 12 together until they meet face-to-face. Films 18 stretch to accommodate object 24. Object 24 is immobilized between the films, and is thereby suspended in the shell chamber, as shown in FIG. 5.

The frame members 12 and the insert trays 16 can be formed from any material which is formable into the appropriate configuration. For example, the frame members 12 and insert trays 16 can be formed from stamped metal, paper or plastic. The frame members 12 and insert trays 16 are preferably formed from a rigid plastic, which is easily fabricated and is resistant to attack by water, to temperature changes or to rough handling during shipping. Plastic materials which are rigid and impact 2 was resistant, but flexible enough to allow the hinge to flex, are useful for this purpose. Plastic materials which can be used include polymer and co-polymer materials, such as polyvinylchloride (PVC), polyethylene terephthalate (PET) and polyethylene terephthalate, glycol-modified (PETG). PVC, PET or PETG co-polymers having the desired characteristics can also be used. PVC polymers and co-polymers are particularly useful due to their low cost, formability and durability. In one preferred embodiment designed for holding small objects a few inches in dimension, clear PVC having a thickness of about 0.020 inches is used for the frame members 12 and the insert trays 16. The frame members 12 and insert trays 16 are preferably, but not necessarily, formed from the same material. It may be desirable in some cases to have the frame members and insert trays fabricated from different materials.

The frame members 12 and insert trays 16 can be manufactured by techniques known in the art. In one preferred embodiment where PVC is used, the frame members 12 and insert trays 16 are stamped with a die from PVC sheet stock. Other manufacturing techniques can be used, such as vacuum forming, compression molding or injection molding. The manufacturing technique will be determined in part by the materials selected.

The resilient film 18 can be formed from any elastic material which exhibits certain characteristics. The material must be elastic or resilient, that is, it must easily stretch to conform to a shaped object, retain its tensile strength when stretched and preferably, return to substantially its original configuration when the object is removed, that is, it must have memory. The material must be formable into a thin film which is durable enough so that it will not break during shipping, and can accommodate objects having sharp edges without fear of breaking. Any elastomeric polymer having these characteristics can be used to form the film 18. For example, polyurethane polymers and co-polymers, and olefin-based elastomers can be used to form films useful in the present invention. Films cast from polyurethanes are particularly useful for this purpose. The film generally has a thickness of from about 0.001 to about 0.10 inches, preferably about 0.0025 inches.

The resilient films are formed by techniques well known in the art for making films, such as film casting, sheet extrusion or calendering. Films which are particularly useful in the present invention are polyurethane films available from Deerfield Urethanes (Deerfield, Mass.).

Film 18 is bonded to flanges 26 of insert tray 16. The film 18 can be bonded to the flange by techniques known in the art depending upon the materials used for each. For example, a urethane film can be bonded to a PVC insert by sonic welding or by thermal bonding using a heat-activated adhesive. If an adhesive is used, the adhesive is applied to substantially all of the flanges 26 to define a flange adhesive area for attaching the film. The bonding operation is preferably performed while insert tray 16 is removed from frame member 12 to prevent possible damage to frame member 12 from sonic waves or heat.

Film 18 can be removed from insert tray 16 and replaced as often as necessary. Thus, if film 18 fatigues, breaks or is damaged, insert 16 tray is removed from frame member 12, the damaged film 18 is removed, and a new film 18 is bonded to flanges 26 of insert tray 16. The insert can then be replaced in the frame member 12 and the unit is ready to be reused.

Several different modifications of the design shown in the Figures and described above are possible, and can be incorporated into the design. For example, reinforcing material can be added to the package or the insert trays to make the device more resistant to crushing. The insert trays can be bifurcated or otherwise divided to form several smaller holding areas for smaller objects. Such dividers can be available as separate inserts for placing into the trays or can be molded or stamped in to the trays as permanent fixtures.

The present invention provides a reusable container for packing objects without the use of disposable packing materials. The insert trays which hold the object to be shipped are removable from the package, thus, they can be recycled when worn or damaged. The suspending film covering each insert tray can also be easily replaced, if necessary, and the insert tray itself can be reused. The tray also provides reinforcement to the outer shell making it more resistant to crushing. Due to the suspending action, impacts on the package are transmitted poorly or not at all to the suspended object. The air in the wells also acts as a shock absorbing medium. The present package provides an efficient, cost-effective method for transporting delicate objects without the use of waste generating packing materials.

EQUIVALENTS

Those skilled in the art will recognize, or be able to ascertain using no more than routine experimentation, numerous equivalents to the specific embodiments described herein. Such equivalents are considered to be within the scope of this invention, and are covered by the following claims.

We claim:

1. A suspension cushioning package comprising:
   a. a pair of package frame members, each of which defines a planar face and a well extending therebelow, each said planar face further defining a depressed area around the perimeter of its respective well;
   b. a hinge connecting the frame members to permit articulation between an open position and a closed position wherein said members are disposed face-to-face;
   c. means for locking the frame members in said closed position; and
   d. an insert tray disposed in the well of each frame member, each said insert tray comprising;
      (i) side walls dimensioned to intefit with its respective well, said side walls including flanged portions for interfitting with the respective depressed area; and
      (ii) a stretchable resilient film sealed to the flanged portions and spanning the distance between the flanged portions, and disposed substantially in parallel with the planar face of its respective frame member.

2. The package of claim 1 wherein the insert trays each further comprise a bottom wall which, together with the side walls and film, define an enclosure.

3. The package of claim 1 wherein the hinge is a living hinge.

4. The package of claim 1 wherein the pair of frame members comprise a molded polymer material.

5. The package of claim 1 wherein the insert trays comprise a molded polymer material.

6. The package of claim 1 within the stretchable film comprises an elastomeric polymer.

7. The package of claim 1 wherein the locking means are interfitting mating portions which, when mated together friction fit to hold the package in a closed position.

8. The package of claim 1 wherein the film is thermally bonded to the flanged portions.

9. A suspension cushioning package for packing an object for shipping, comprising:
   a. a pair of package frame members, each of which defines a planar face and a well extending therebelow, each said planar face further defining a depressed area around the perimeter of its respective well;
   b. a hinge connecting the frame members;
   c. two interfitting insert tray having side walls including flanged portions, which insert trays are dimensioned to removably interfit within the wells of the frame members with the flanged portions interfitting with said depressed areas;
   d. a pair of stretchable, resilient films, each of which is adhered to the flanged portions of the side walls of one of the insert trays and disposed substantially in parallel with the planar face of said one of the frame members; and
   e. interlocking fastening means located on the outer edges of the frame members for locking the frame members in a closed position;

wherein the films adhered to the insert trays stretch to conform to the shape an object placed therebetween, thereby immobilizing the object by suspending it between the films.

10. The package of claim 9 wherein the frame members and insert trays comprise a molded polymer material.

11. The package of claim 9 wherein the film comprises an elastomeric polymer.

12. The package of claim 11 wherein the elastomeric polymer is a polyurethane film having a thickness of from about 0.01 inches to about 0.001 inches.

13. The package of claim 9 wherein the film is thermally bonded to the flanged portions of its respective insert tray.

* * * * *